US008650557B2

(12) United States Patent
Ogura

(10) Patent No.: US 8,650,557 B2
(45) Date of Patent: Feb. 11, 2014

(54) INFORMATION PROCESSING APPARATUS AND METHOD FOR TRANSFERRING LICENSE

(75) Inventor: Yoshihiro Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 344 days.

(21) Appl. No.: 13/111,301

(22) Filed: May 19, 2011

(65) Prior Publication Data

US 2011/0296400 A1    Dec. 1, 2011

(30) Foreign Application Priority Data

May 28, 2010  (JP) ................................. 2010-123403

(51) Int. Cl.
*G06F 9/445* (2006.01)
(52) U.S. Cl.
USPC ............ 717/174; 717/169; 717/171; 717/173
(58) Field of Classification Search
USPC .................................. 717/169, 171, 173, 174
See application file for complete search history.

(56) References Cited

U.S. PATENT DOCUMENTS

| 5,390,297 | A | * | 2/1995 | Barber et al. .................. 726/29 |
| 5,745,879 | A | | 4/1998 | Wyman |
| 6,816,842 | B1 | * | 11/2004 | Singh et al. ..................... 705/59 |
| 6,920,567 | B1 | * | 7/2005 | Doherty et al. ................. 726/22 |
| 7,096,203 | B2 | * | 8/2006 | Pence et al. ..................... 705/59 |
| 7,363,318 | B1 | * | 4/2008 | Dere et al. ............................. 1/1 |
| 7,430,669 | B2 | * | 9/2008 | Osada ............................ 713/187 |
| 7,483,860 | B2 | * | 1/2009 | Cronce et al. ................... 705/50 |
| 8,051,158 | B2 | * | 11/2011 | Kojima .......................... 709/223 |
| 8,079,090 | B2 | * | 12/2011 | Okada ............................. 726/27 |
| 8,175,978 | B2 | * | 5/2012 | Endoh .............................. 705/59 |
| 8,280,818 | B2 | * | 10/2012 | Ebihara et al. .................. 705/59 |
| 8,316,458 | B2 | * | 11/2012 | Mikami .......................... 726/27 |
| 8,321,530 | B2 | * | 11/2012 | Miyazawa ..................... 709/217 |
| 8,351,608 | B2 | * | 1/2013 | Kobayashi ..................... 380/277 |
| 8,544,000 | B2 | * | 9/2013 | Ogura ............................ 717/178 |
| 2004/0205261 | A1 | * | 10/2004 | Osada ............................... 710/8 |
| 2004/0230842 | A1 | * | 11/2004 | Osada ........................... 713/202 |
| 2005/0021992 | A1 | * | 1/2005 | Aida et al. ..................... 713/200 |
| 2006/0026105 | A1 | * | 2/2006 | Endoh .............................. 705/59 |
| 2006/0200420 | A1 | * | 9/2006 | Osada ............................. 705/59 |
| 2008/0005029 | A1 | | 1/2008 | Ando |
| 2008/0244057 | A1 | | 10/2008 | Kojima |

FOREIGN PATENT DOCUMENTS

EP        1 965 330 A2    9/2008
JP        2006-018402    1/2006

OTHER PUBLICATIONS

Extended European search report dated Feb. 1, 2013.

* cited by examiner

*Primary Examiner* — Phillip H Nguyen
(74) *Attorney, Agent, or Firm* — IPUSA, PLLC

(57) ABSTRACT

An information processing apparatus includes an install unit to receive install data for software to install the software for providing a function, an acquisition unit to acquire a license file for activating the function, a management unit to manage information indicative of presence or absence of a license to use the function, independently of presence or absence of the license file, and an update unit to update the information indicative of presence or absence of the license upon transferring the license between apparatuses.

20 Claims, 16 Drawing Sheets

FIG.2

| |
|---|
| FUNCTION IDENTIFIER (PRODUCT ID): 13579 |
| LICENSE IDENTIFIER (LICENSE ID): 2468ABCDE |
| LICENSE ORIGIN APPARATUS: APPARATUS A |
| LICENSE COPY RECIPIENT APPARATUS: APPARATUS B, APPARATUS C |
| LICENSE AVAILABILITY: NO |

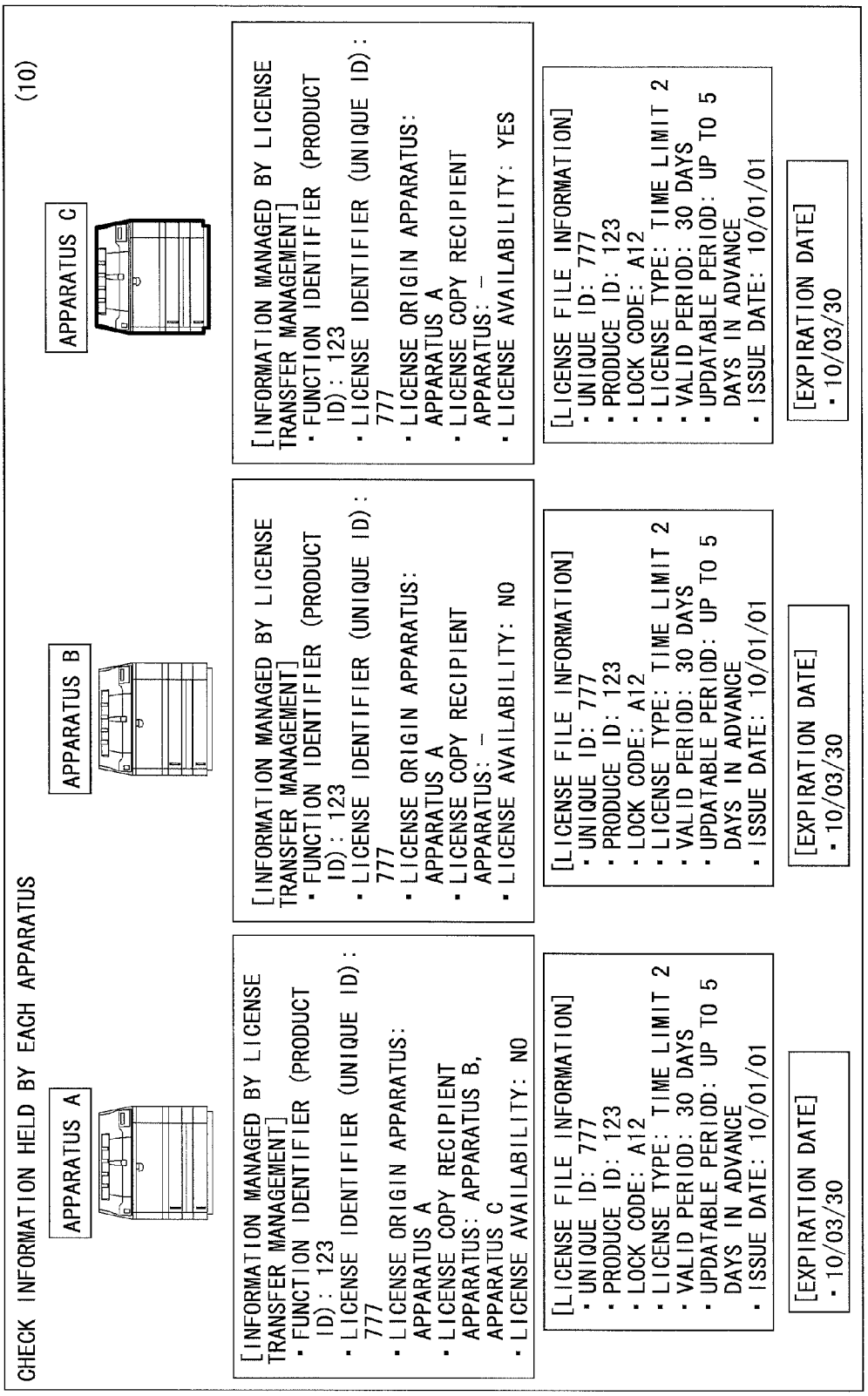

INFORMATION PROCESSING APPARATUS AND METHOD FOR TRANSFERRING LICENSE

BACKGROUND OF THE INVENTION

1. Field of the Invention

The disclosures herein relate to a technology for managing software licenses used in various types of apparatuses (i.e., information processing apparatuses) such as personal computers and copier machines.

2. Description of the Related Art

When software is installed in an apparatus such as a PC (i.e., personal computer) or a copier machine, a license management system is typically employed. The license management system resides in a server, and is accessed from an apparatus upon installing software or at the time of requesting license upon installing software. The license management system then issues a license in exchange for information that identifies the installed apparatus. The software thereafter becomes usable. Further, the license management system prevents unauthorized use of the software in apparatuses other than the installed apparatus.

In some cases, it may be desirable to transfer a license from one apparatus having acquired the license to another apparatus. Conventionally, there are two types of license management systems to perform such transfer.

The first type instructs the apparatus having acquired a license to return the license when it is desired to transfer the license from this apparatus to another apparatus. Such another apparatus then installs the software, and newly acquires the license.

The second type does not instruct the apparatus having acquired a license to return the license. Rather, the license management system cancels the license of such an apparatus. The license is then issued to another apparatus.

Japanese Patent Application Publication No. 2006-018402 discloses a system that manages a license for software installed in an apparatus for the purpose of preventing unauthorized use of the software and transferring software license information. After a license is issued to a first apparatus, a second apparatus may request to install the software. In response, this system allows the software to be installed in the second apparatus (i.e., issues license to the second apparatus). Also, the system prohibits the first apparatus having the issued license from using the software, and instructs the first apparatus to transfer license information to the second apparatus.

The license management system described above checks whether a user is a legitimate user before issuing a license for the purpose of preventing unauthorized use. To this end, the license management system requests the user to enter a license key comprised of more than ten or so alpha-numerals.

In order to transfer a license from an apparatus having the license to another apparatus, the user is required to know the license key (i.e., to remember or have access to the license key information) in either the first type of license management system or the second type of license management system. Since the license key was used at the time of obtaining the license, the administrator of the apparatus to which the license was issued may typically keep the license key. In some cases, however, the administrator may have forgotten or lost the license key. The license key needs to be reissued in such a case. Even when the license key is available, it is cumbersome for the user to operate both the apparatus having an issued license and the apparatus going to receive a transferred license if these two apparatuses are situated in separate locations. In such a case, it may be possible to request another person to operate one of the apparatuses. However, this arrangement may also be cumbersome since the license key information needs to be communicated.

Accordingly, there may be a need to provide an information processing apparatus that can easily transfer a license for installed software, without requiring a license key and without imposing excessive load on a user, between apparatuses for which software licenses are managed by a license management system.

SUMMARY OF THE INVENTION

It is a general object of at least one embodiment of the present invention to provide an information processing apparatus and an information processing method that substantially eliminate one or more problems caused by the limitations and disadvantages of the related art.

In one embodiment, an information processing apparatus includes an install unit to receive install data for software to install the software for providing a function, an acquisition unit to acquire a license file for activating the function, a management unit to manage information indicative of presence or absence of a license to use the function, independently of presence or absence of the license file, and an update unit to update the information indicative of presence or absence of the license upon transferring the license between apparatuses.

In one embodiment, an information processing method includes an install step of receiving install data for software and installing the software for providing a function, an acquisition step of acquiring a license file for activating the function, a management step of managing information indicative of presence or absence of a license to use the function, independently of presence or absence of the license file, and an update step of updating the information indicative of presence or absence of the license upon transferring the license between apparatuses.

According to at least one embodiment, an information processing apparatus can easily transfer a license for installed software, without requiring a license key and without imposing excessive load on a user, between apparatuses for which software licenses are managed by a license management system.

BRIEF DESCRIPTION OF THE DRAWINGS

Other objects and further features of embodiments will be apparent from the following detailed description when read in conjunction with the accompanying drawings, in which:

FIG. 2 is a drawing illustrating an example of information managed by a license transfer management unit;

FIGS. 9A through 9E are drawings illustrating another example of a specific process performed for license transfer.

DESCRIPTION OF THE PREFERRED EMBODIMENTS

In the following, embodiments of the present invention will be described with reference to the accompanying drawings.
<Configuration>

Figure 1:
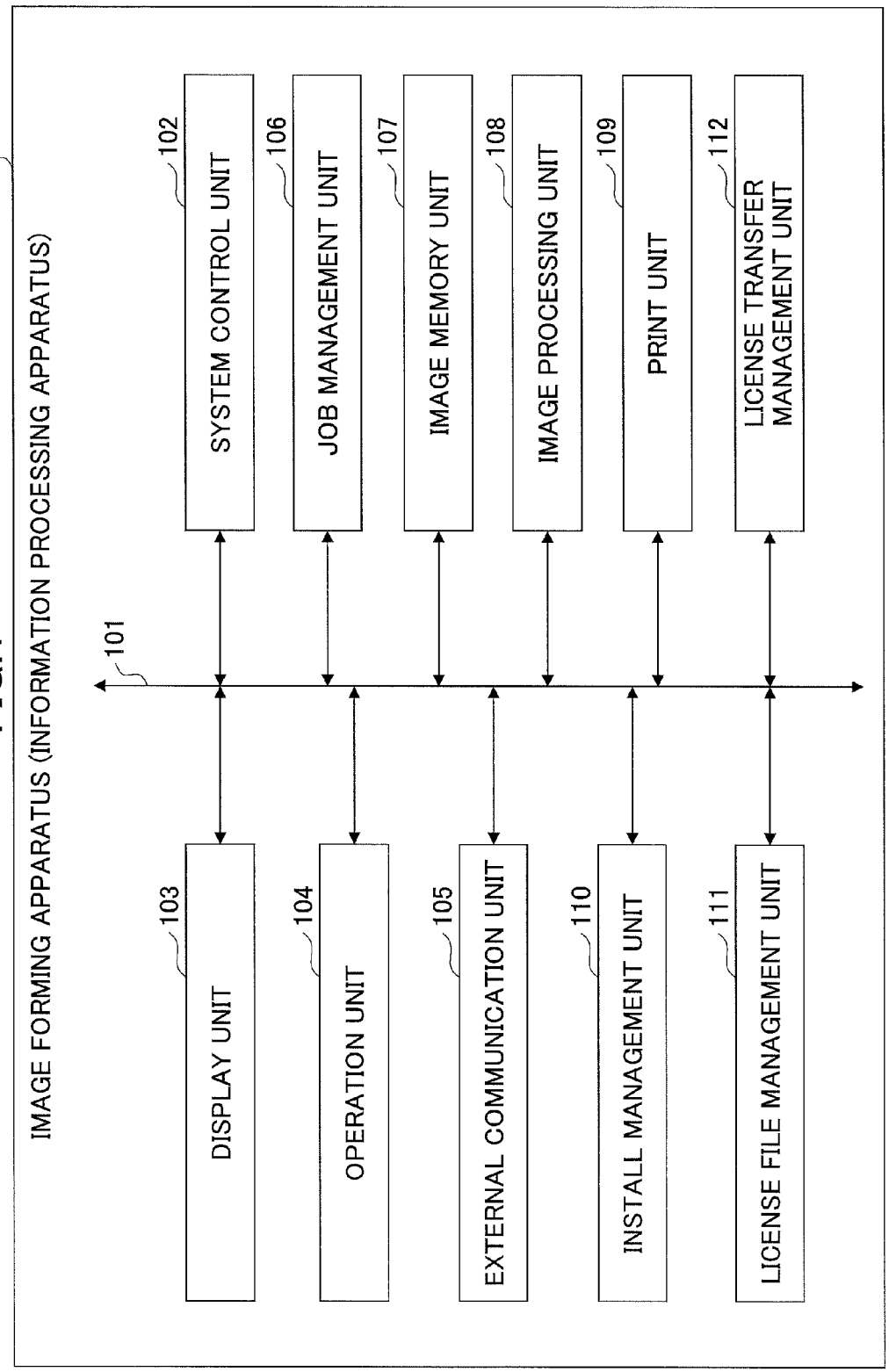
FIG. 1 is a drawing illustrating an example of the configuration of an image forming apparatus according to an embodiment.

FIG. 1 is a drawing illustrating an example of the configuration of an image forming apparatus according to an embodiment.

An image forming apparatus 1 illustrated in FIG. 1 includes a system control unit 102, a display unit 103, an operation unit 104, an external communication unit 105, a job management unit 106, an image memory unit 107, an image processing unit 108, a print unit 109, an install management unit 110, a license file management unit 111, and a license transfer management unit 112, which are connected to one another through a system bus 101.

The system bus 101 serves as a path connecting between the units constituting the image forming apparatus 1.

The system control unit 102 may be a CPU (Central Processing Unit) or the like. The system control unit 102 loads a program stored in a nonvolatile memory to a work area (e.g., RAM) to control the units in accordance with the program.

The display unit 103 displays information on the screen in response to display data specified by the system control unit 102.

The operation unit 104 is comprised of a keyboard having various types of function keys or the like, and sends a signal responsive to a pressed key to the system control unit 102.

The external communication unit 105 communicates with a license management system (e.g., server) or the like that is externally provided. In addition to the license management system, what is externally provided includes a component server and a memory device (e.g., SD card).

The job management unit 106 schedules jobs such as print jobs.

The image memory unit 107 stores image data, print data, and the like.

The image processing unit 108 performs image processing such as enlarge, reduce, rotate, and the like with respect to input image data, and outputs the processed image data to the print unit 109.

The print unit 109 is provided with a photoconductive drum, toner, a paper feed unit, a paper discharge unit, and the like. In accordance with a print command from the system control unit 102, the print unit 109 feeds a print sheet from the paper feed unit, and forms an image on the photoconductive drum in response to image data supplied from the image processing unit 108 to develop the image with toner, followed by transferring the toner from the photoconductive drum to the print sheet for fusing thereon, and then discharging the print sheet from the paper discharge unit.

The install management unit 110 manages and controls configuration information regarding software installed in the image forming apparatus 1.

The license file management unit 111 controls and manages license files downloaded from the license management system by use of the external communication unit 105. The license file management unit 111 uses the license file information to make a decision regarding license update, automatic license return, and the like.

The license transfer management unit 112 controls and manages information about license file transfer. The license transfer management unit 112 performs actions relating to license operations in association with other apparatuses. License operations include making inquiries about functions/licenses to other apparatuses and controlling the transfer of functions/licenses. Further, deactivation/activation (either automatically or manually performed) is controlled with respect to another apparatus (i.e., apparatus on the license transfer path).

FIG. 2 is a drawing illustrating an example of license transfer management information managed by the license transfer management unit 112. The license transfer management information includes a function identifier (i.e., product ID), a license identifier (i.e., license ID), license origin apparatus, license copy recipient apparatus, and license availability. The license origin apparatus, license copy recipient apparatus, and license availability are newly provided information that is not present in an existing apparatus.

<<Function Identifier (i.e., Product ID)>>

The function identifier identifies the function (i.e., software) that is installed in the local apparatus. A user who uses an apparatus that is a recipient (from which an operation is performed) of a license transferred between devices may not know the function/license that the user wishes to receive.

The function identifier is referred to in order to let the user know the transferable function/license when the recipient (from which an operation is performed) acquires a list of functions from each apparatus.

<<License Identifier (i.e., License ID)>>

A license file is obtained upon installing a function from the license management system. The license file management unit 111 stores the actual license file. As separate information from the license file, the license identifier serves to indicate whether there is a license (i.e., right) to use the function, and is linked with the license file.

<<License Origin Apparatus>>

A function/license is transferred between apparatuses without using the license management system. After the license is transferred, automatic license update, automatic deactivate (i.e., to return the license), or manual deactivate followed by activate may be performed depending on the type of the license. In such a case, communication with the license management system occurs. At the time of originally issuing the license to an apparatus, the license management system communicated with the apparatus, and already acquired information (e.g., serial No.) that identifies the apparatus. The license management system may typically control and manage the license by linking the license with the acquired information. In consideration of this, accessing the license management system from an apparatus having received the transferred license is not desirable since this access comes from an apparatus that is different from the apparatus linked with the license. Such an access may be refused by the license management system that manages a license by linking a license with an apparatus. If the license management system has no mechanism to link a license with an apparatus, on the other hand, a license operation requested by an apparatus that performs access first may be performed, resulting in inconsistency with other apparatuses on the license transfer path. In order to avoid this, and also in order to avoid imposing the burden of handling license transfer on the license management system, provision is made such that only the apparatus (i.e., origin apparatus) having initially acquired the license is allowed to access the license management system. By restricting access to the origin apparatus, there will be no inconsistency with respect to the license and apparatus identification information managed by the server.

An apparatus becomes the origin only if the apparatus initially acquires the license. All the other apparatuses that reside on the license transfer path do not become the origin. In the disclosed configuration, the license origin apparatus information does not merely indicate whether the apparatus is the origin, but indicates which apparatus is the origin. With this arrangement, a user can identify the apparatus that is allowed to access the license management system when the user manually attempts to acquire a license by operating an apparatus that is on the license transfer path but has already transferred the license to another apparatus, in addition to learning that the attempted operation is improper because of the lack of the origin status and also because of the fact that the license has already been transferred.

<<License Copy Recipient Apparatus>>

A function/license is transferred between apparatuses without using the license management system. After the license is transferred, updating and removal of the license file through automatic license update and automatic deactivate (i.e., to return the license) may be performed depending on the type of the license. In such a case, only the origin apparatus communicates with the license management system as was described in connection with "license origin apparatus". Namely, the origin apparatus needs to take care of the updating and removal of license for the apparatuses on the license transfer path, on which the transfer of the license leaves a copied license file in each apparatus. To this end, the license copy recipient apparatus information is used to identify all the apparatuses on the license transfer path (i.e., all the apparatuses having a copied license file).

<<License Availability>>

When a function/license is transferred, a license file is copied and supplied to the recipient. In the absence of any countermeasure, unauthorized use of the license may occur without the knowledge of the license management system, resulting in an effective increase in the number of licenses issued by the server. To prevent such unauthorized use, the fact that the license is no longer available is indicated for an apparatus from which the function/license has already been transferred through the copying of the license. This is indicated by use of information indicative of "No" about license availability. The fact that the license is available is indicated by "Yes".

<License Transfer>

Figure 3:
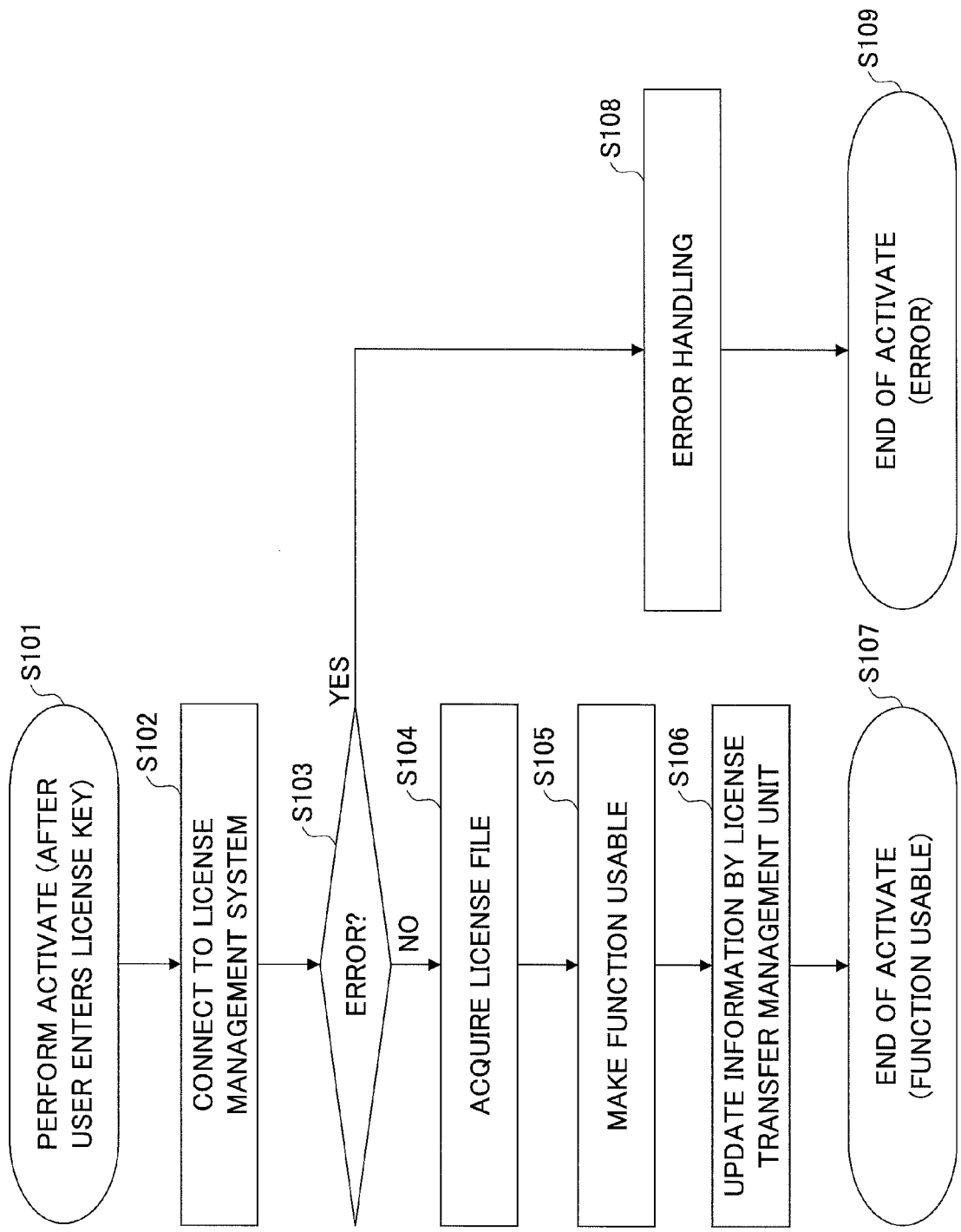
FIG. 3 is a flowchart illustrating an example of an install and activate process.

FIG. 3 is a flowchart illustrating an example of a process performed at the time of installment/activation. This is performed when an activate process is performed to acquire the license upon installing software. It may be noted that the function of software does not become usable simply by installing the software, but becomes usable upon activation. Further, deactivation may be performed to disable the function after the activation.

In step S101, an activate process is started by a user upon entering a license key on the screen for the purpose of obtaining license to use the function. In step S102, communication is established with the license management system, which checks the authenticity of the license key.

In step S103, the procedure branches depending on whether an error such as a connection error or a wrong license key is detected When an error is detected, an error handling process is performed in step S108, followed by the termination of activation due to an error in step S109.

When an error is not detected, i.e., when the authenticity of the license key is confirmed, a license file is obtained from the license management system in step S104. The license file includes a license type, an expiration date, etc.

In step S105, a process to make the function usable is performed by use of the acquired license file. With this, the function becomes usable for a limited time period specified by the expiration date contained in the license file.

In step S106, the license transfer management unit 112 controls and manages information regarding the function that has become usable upon acquiring the license. To this end, an ID indicative of the function and an ID indicative of the license file are recorded. Further, information indicative of the local apparatus is set in the license origin apparatus information, and the fact that the license is available is set in the license availability information. No setting is made to the license copy recipient apparatus information at this time. This information is updated when the license to use the function is transferred to another apparatus. In step S107, the activate process comes to an end, with the function being usable.

Figure 4:
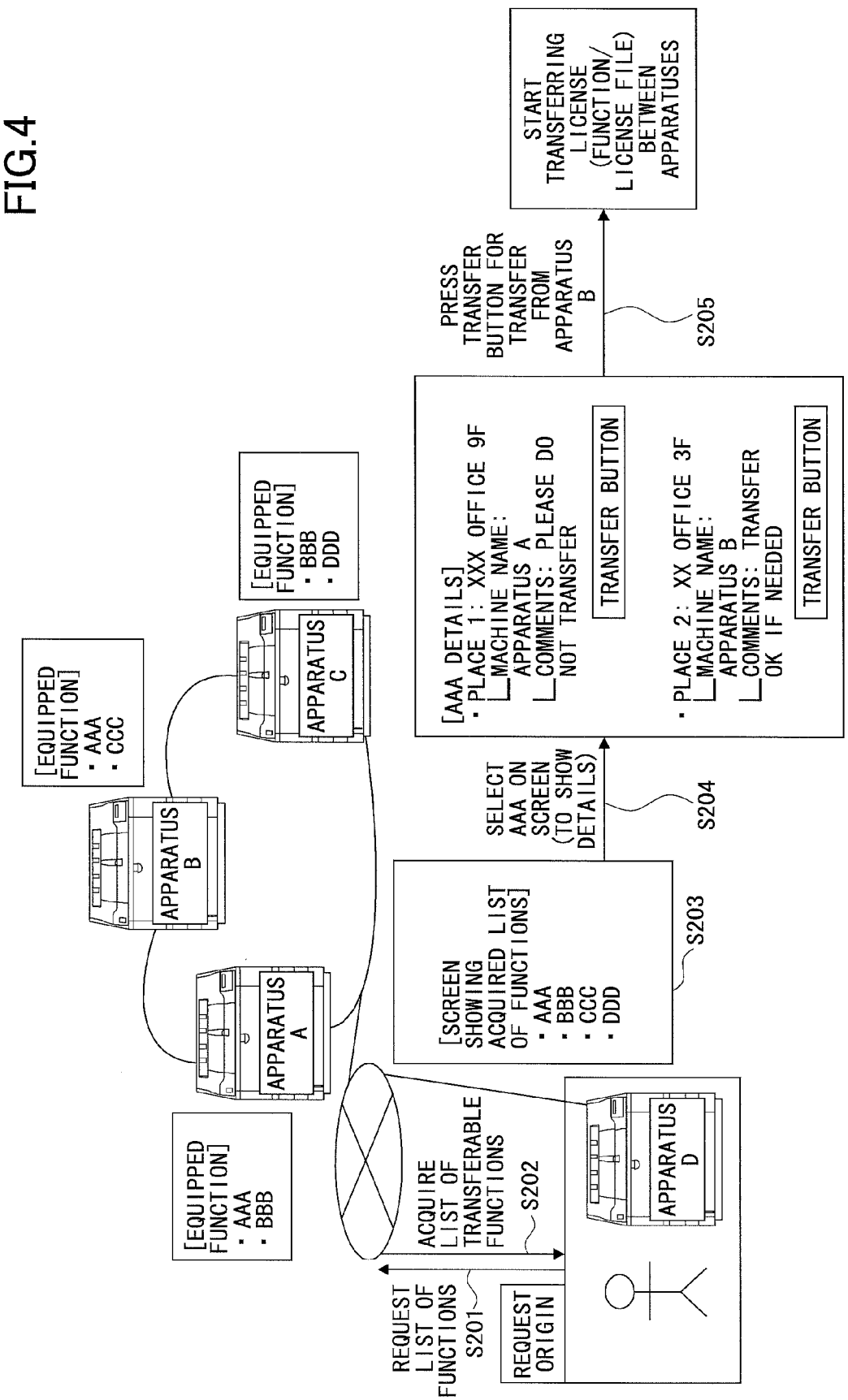
FIG. 4 is a drawing illustrating an example of a function/license selecting process performed by a transfer recipient apparatus with respect to a transfer origin apparatus.

FIG. 4 is a drawing illustrating an example of a function/license selecting process performed by a transfer recipient apparatus (i.e., request origin) with respect to a transfer origin apparatus (i.e., request recipient).

In step S201, a request-origin apparatus D requests apparatuses A, B, C, and so on connected through the network to provide a list of functions.

In response to the request, the apparatuses return information about functions installed in themselves to the apparatus D. In step S202, the apparatus D receives this information. Functions that are firmware or that are not subject to install/uninstall or license transfer do not need to be included in the information that is returned in response to the request.

Upon receiving the information from each apparatus, the apparatus D displays functions on the screen in step S203. In step S204, the user selects a function of interest or a function that the user needs, resulting in a detail screen being displayed. The detail screen shows information (e.g., names and descriptions) about the functions, and also shows information that helps the user to decide an apparatus from which a license is transferred, such as the information indicative of the place of an apparatus, the frequency of use of a function, comments provided in a free format (which may indicate the request "please do not transfer").

In step S205, the user selects an apparatus from which a function/license file and license are transferred, followed by giving an instruction to perform transfer.

Figure 5:
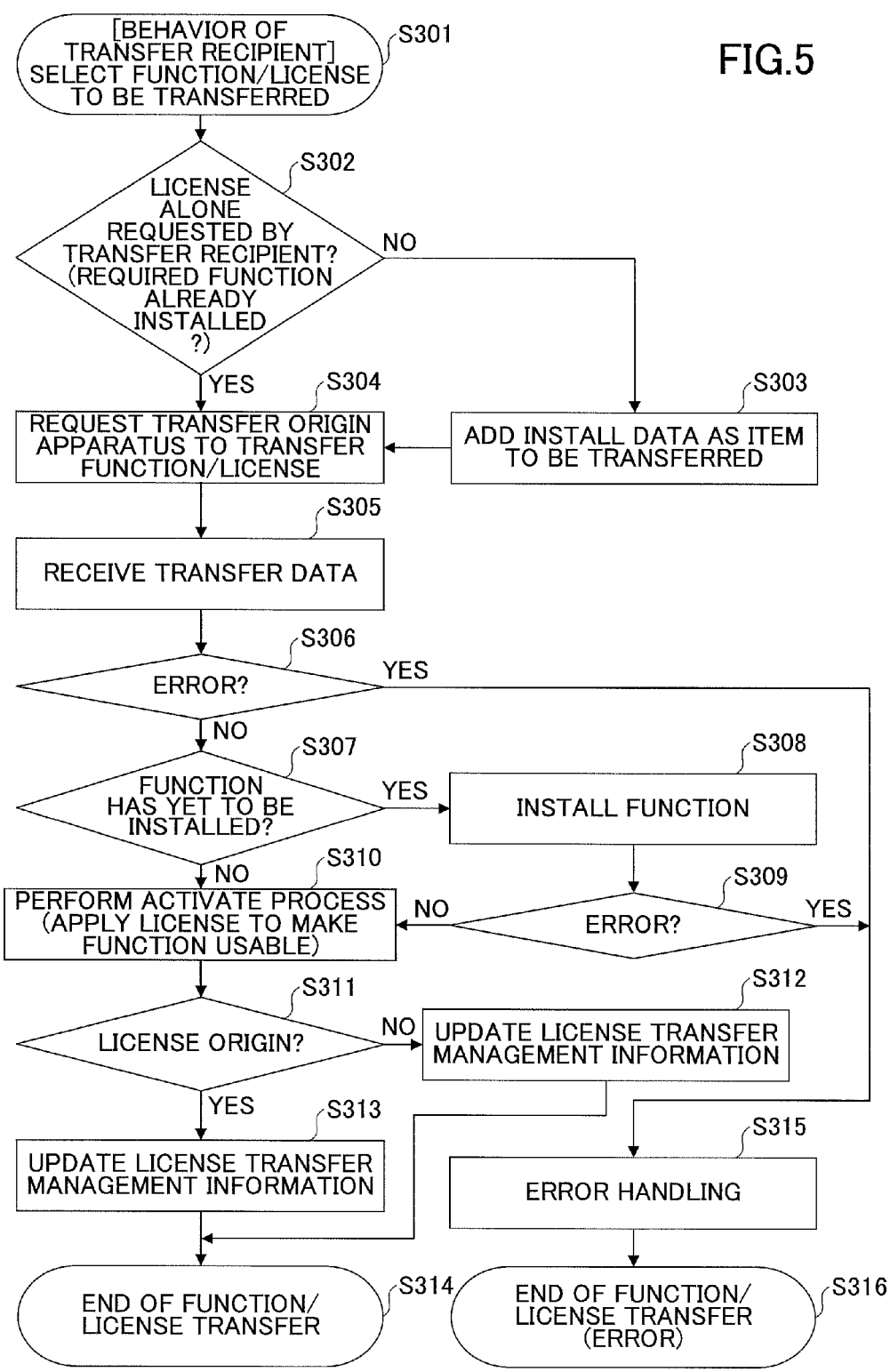
FIG. 5 is a flowchart illustrating an example of a process performed by the transfer recipient apparatus at the time of license transfer.

FIG. 5 is a flowchart illustrating an example of a process performed by the transfer recipient apparatus (i.e., request origin) at the time of license transfer.

In step S301, a process starts upon selecting the function/license to be transferred. In step S302, the status of the local apparatus is checked before sending a function/license transfer request to the request recipient. This is because the local apparatus may be in different statuses when requesting the transfer of a function/license to the transfer origin apparatus. Namely, the local apparatus may have the function already installed therein without a valid license, or the local apparatus may not have the function itself.

When the function is not in existence, in step S303, provision is made such that install data is added as a request item that is to be requested at the time of requesting the transfer origin to transfer the function/license. This happens when the function has not been installed or when install data is necessary because of a version difference.

In step S304, the transfer of the function/license is requested. If install data is added as a request item in step S303, the install data is also requested.

In step S305, transferred data is received in accordance with the function license.

In step S306, a check is made as to whether an error has occurred upon receiving the transferred data. In the absence of error, a check is made in step S307 as to whether the function has yet to be installed.

In the case in which the function has not been installed (i.e., when the function is one of the transfer-requested items), an install process is performed in step S308 by use of the received install data. Nonetheless to say, an update process is performed when the install data is requested because of a version difference. Upon detecting no error at the time of installment in step S309, the procedure proceeds to step S310, which is performed also when no installment is performed.

In step S310, an activate process is performed by use of the license file to make the function usable. Unlike the normal activate process, no communication with the license management system is performed upon transferring the function/license between apparatuses. This is also the case with respect to the transfer origin.

In step S311, a check is made as to whether the local apparatus is the license origin. Upon detecting that the local apparatus is not the license origin, the license transfer management unit 112 updates the relevant information in step S312. Namely, the license availability information is set to indicate a license available state, and the license origin apparatus information is set to specify which apparatus is the origin apparatus. Further, the license copy recipient apparatus information is blank since no apparatus other than the license origin apparatus is using the license.

A situation in which the local apparatus is the license origin occurs under the following conditions. The license origin apparatus performs activation based on an external system to use the function. Another apparatus subsequently requests transfer of the license of the function, so that the license origin apparatus cancels its own license. After the license is transferred to such another apparatus, the local apparatus (i.e., license origin apparatus) takes back the license from the apparatus that currently has the license.

If the local apparatus is the license origin, the license transfer management unit 112 updates the relevant information in step S313. Namely, the license availability information is set to indicate a license available state, and the license origin apparatus information is not updated since this information already indicates that the local apparatus is the origin apparatus. Also, the license copy recipient apparatus information is not updated since there is no need to specify the license origin as being on the license copy path. In step S314, the procedure of transferring a function/license comes to an end.

If an error occurs upon receiving the transfer data or upon analysis after the receipt (or upon performing an install process), data transfer is requested again in the data handling process performed in step S315. Alternatively, the license transfer may come to an end as a failed process. If the transfer data is free from error, but an error occurs during the install process or activate process, a recovery process may be performed since the error is contained within the local apparatus. If an error occurs even after the recovery process, the local apparatus may not be able to use the license. In such a case, a roll-back process such as a process to return the license to the transfer origin is performed in order to prevent inconsistency between apparatuses with respect to the information managed by the license transfer management unit.

In this flowchart, install data and license file data are requested and received as they become necessary. When license transfer for use of the function is performed many times between apparatuses, each of the apparatuses may end up having the installed data and the license file. In such a case, a request to transfer only the license to use the function may be sent to the request recipient. The data received in this case may only include information necessary for managing license transfer (e.g., the license origin apparatus information and the expiration date indicative of the valid period provided for the license origin (not the valid period of a license file)).

The license copy recipient apparatus information does not need to be included in the data received upon requesting license transfer because this information is supposed to be reported to the origin apparatus when the license is transferred from a non-origin apparatus to another apparatus. The license availability information also does not need to be included in the received data because this information is changed to indicate a license available state upon receiving the license. These types of information may need to be reported, however, when the roll-back process or the like is performed to ensure consistency between apparatuses.

Figure 6:
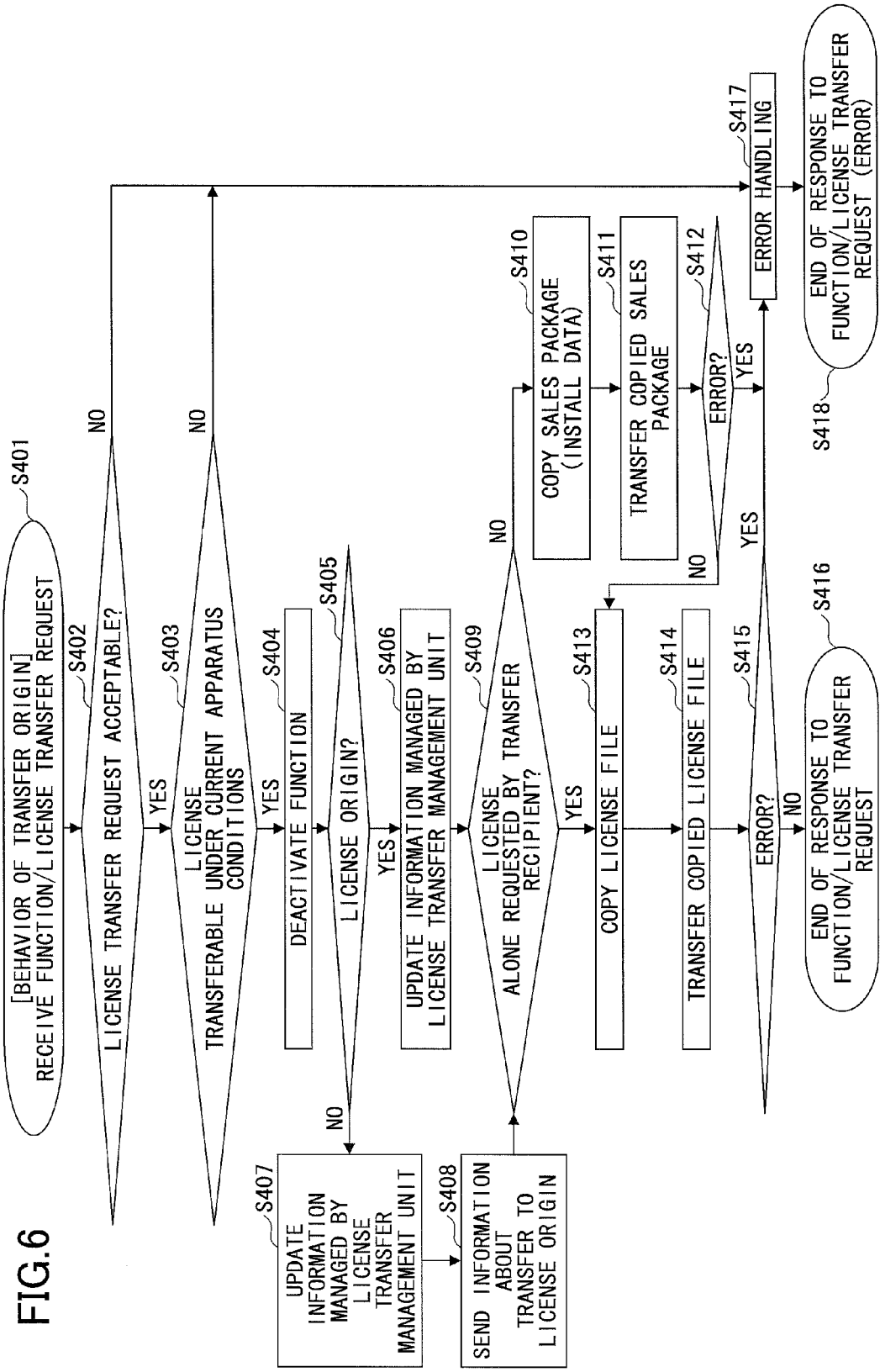
FIG. 6 is a flowchart illustrating an example of a process performed by the transfer origin apparatus at the time of license transfer.

FIG. 6 is a flowchart illustrating an example of a process performed by the transfer origin apparatus (i.e., request recipient) at the time of license transfer.

In step S401, a process starts upon receiving a function/license transfer request. In step S402, a check is made as to whether the license transfer request is acceptable. For example, a license file may be in existence, but the license which was used before may already have been transferred to another apparatus. In such a case, the license transfer is not possible, thereby necessitating an advance check as to whether the license transfer request is acceptable.

Upon finding that the license transfer request is acceptable, a check is made in step S403 as to whether the transfer of the function/license is performable. This is because the function/license is not transferable if the function of the requested license is being used, or is in a standby state and ready to be used (e.g., scheduled to be used).

Upon finding that the license is transferable, a deactivate process is performed in step S404 to make the function unusable. A normal deactivate process serves to return the license to the license management system. However, the above-noted deactivate process performed in the case of the function/license transfer request does not return the license to the license management system because the process's ultimate purpose is to transfer the function/license between apparatuses. In this arrangement, the deactivate process performs a disabling process to disable the link associated with the license, rather than returning the license.

In step S405, a check is made as to whether the local apparatus is the license origin based on the information managed by the license transfer management unit 112.

If the local apparatus is the license origin, the license transfer management unit 112 adds information indicative of the transfer recipient apparatus to the license copy recipient apparatus information. Further, the license availability information is updated to indicate a license unavailable state.

If the local apparatus is not the license origin, the license transfer management unit 112 updates the license availability information to indicate a license unavailable state in step S407. Since the local apparatus is not the license origin, the license copy recipient apparatus information is not used.

In step S408, information indicating that the license is transferred to another apparatus is reported to the license origin apparatus. Upon receiving this report, the license origin apparatus adds information indicative of the transfer recipient apparatus to the license copy recipient apparatus information managed by the license transfer management unit 112.

In step S409, a check is made as to whether a license file is to be transferred alone, or is to be transferred together with install data for installing the function itself. Which one of these two transfer processes is requested is indicated by the request that is made at the beginning of this procedure.

If the install data is required as a transfer item, install data for the function, i.e., data of a sales package provided in a release form, is copied in step S410.

In step S411, the copied install data is transferred to the request origin apparatus. Upon detecting no error in step S412, the procedure proceeds to step S413, which is performed also when the license alone is transferred.

In step S413, the license file linked with the function is copied.

In step S414, the copied license file is transferred to the request origin apparatus. The copying/transferring of a license file may be restricted based on the maximum number of times (e.g., 10 times) copying/transferring is performed, or may be restricted to copying/transferring within the same floor or the like (i.e., by use of floor information).

Upon detecting no error in step S415, the procedure of responding to the function/license transfer request comes to an end in step S416.

An error handling process in step S417, when performed in response to step S402/S403 prior to accepting the request (prior to performing transfer), simply notifies the request origin apparatus that the requested transfer is not performable. When the error handling process is performed in response to an error occurring during data transfer or the like, however, a roll-back process to return to the state prior to updating is performed since the information managed by the license transfer management unit 112 has already been updated. In step S418 subsequent to the error handling process, the procedure of responding to the function/license transfer request comes to an end, with an indication of error.

The fact that the roll-back process is performed in the local apparatus at the time of occurrence of error during data transfer or the like is also reported to the request origin apparatus, thereby prompting the request origin to also perform a roll-back process in order to avoid inconsistency between apparatuses.

If such a report does not reach the request origin apparatus due to the disconnection of communication lines or the like, reporting is retried several times. Reporting may not succeed despite repeated attempts. In such a case, the license to use the function may be temporarily disabled to avoid inconsistency. The user may be notified of the temporal disabling of the license by screen display, electronic mail, or the like, thereby being prompted to attend to recovery. The report for ensuring consistency may then successfully reach the request origin apparatus. Upon detecting no inconsistency, the disabling may be cancelled, with the relevant apparatuses being rolled back to the original state prior to the request. The roll-back process performed at the request origin apparatus serves to discard partially received data for which data transfer is not yet completed, for example.

In this flowchart, install data and license file data are copied and transferred as they become necessary. When license transfer for use of the function is performed many times between apparatuses, each of the apparatuses may end up having the installed data and the license file. In such a case, it suffices to transfer only the license to use the function to the request origin apparatus. The data transferred in this case may only include information necessary for managing license transfer (e.g., the expiration date provided for the license origin (not the valid period of a license file)). The use of a valid period of a license file (e.g., +3 months) ends up extending the period each time the file is transferred. Since there is a need to abide by the expiration date given to the license origin apparatus, the valid period of the license origin (i.e., the request recipient) needs to be used.

The license copy recipient apparatus information does not need to be provided to the license recipient at the time of license transfer because this information is supposed to be reported to the origin apparatus when the license is transferred from a non-origin apparatus to another apparatus. The license availability information also does not need to be provided because this information is changed to indicate a license unavailable state upon transferring the license. These types of information may need to be reported, however, when the roll-back process or the like is performed to ensure consistency between apparatuses.

Figure 7:
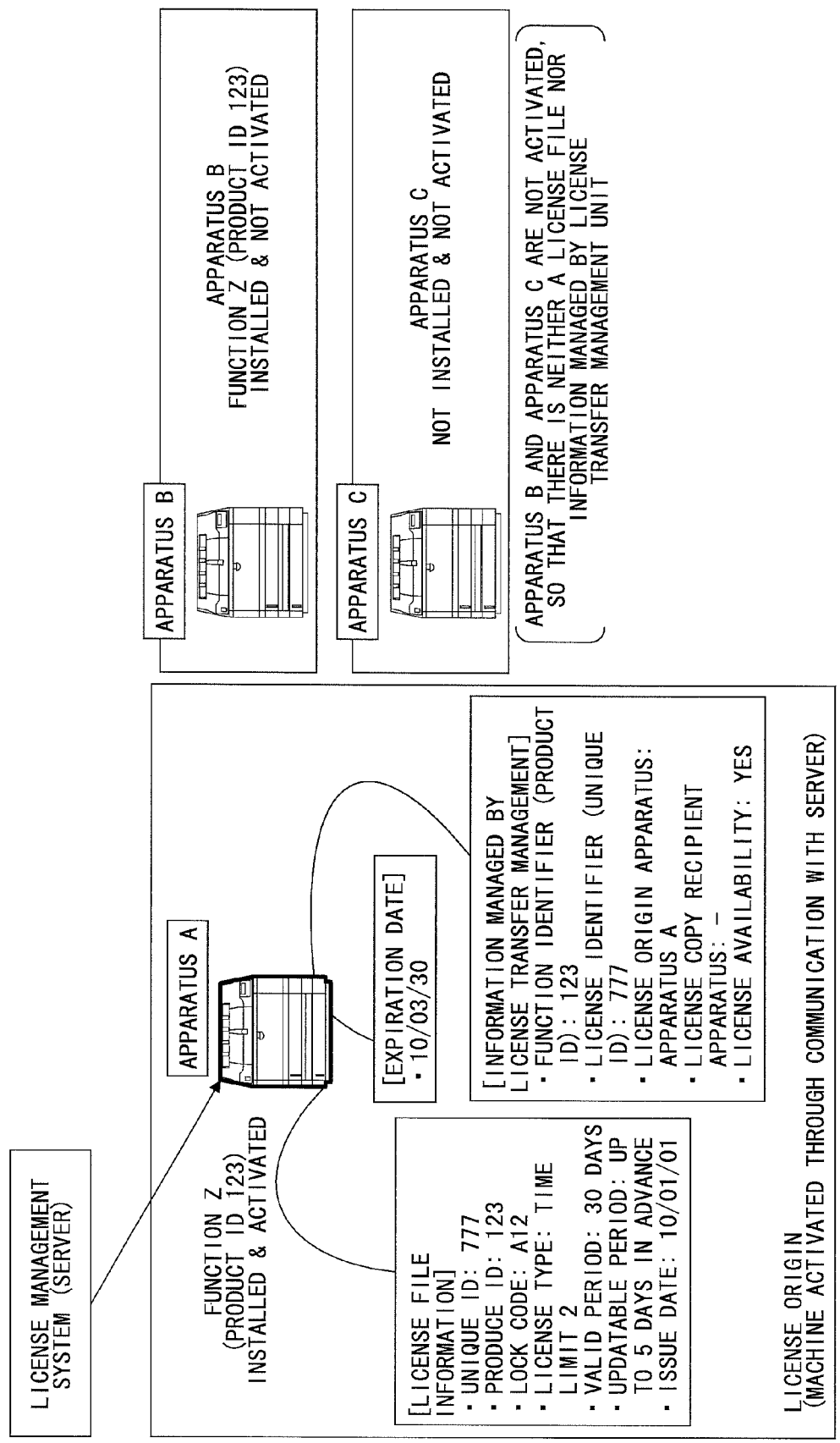
FIG. 7 is a drawing illustrating an example of a specific process performed for license transfer.
Figure 8A:
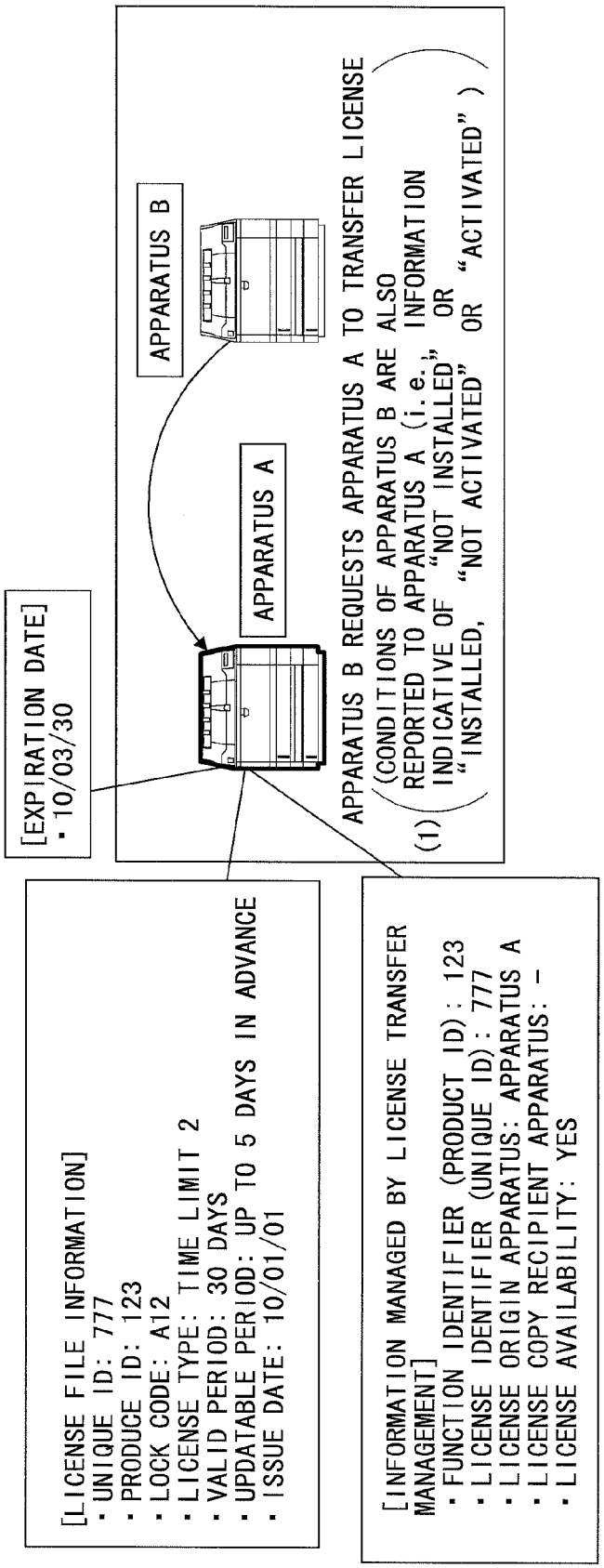
FIGS. 8A through 8E are drawings illustrating another example of a specific process performed for license transfer.
Figure 8B:
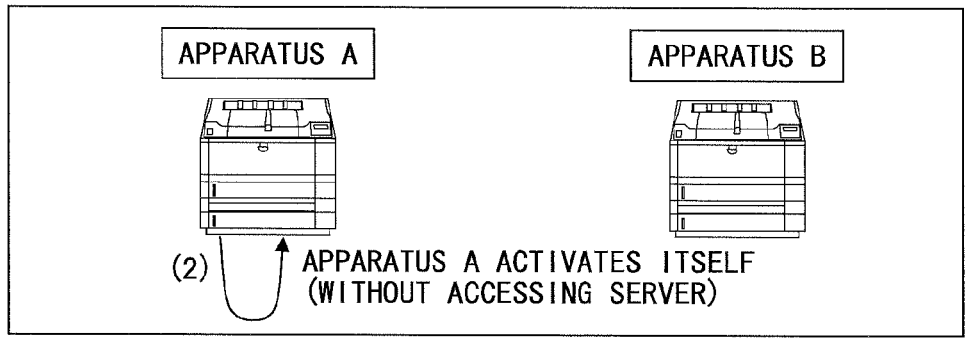
Figure 8C:
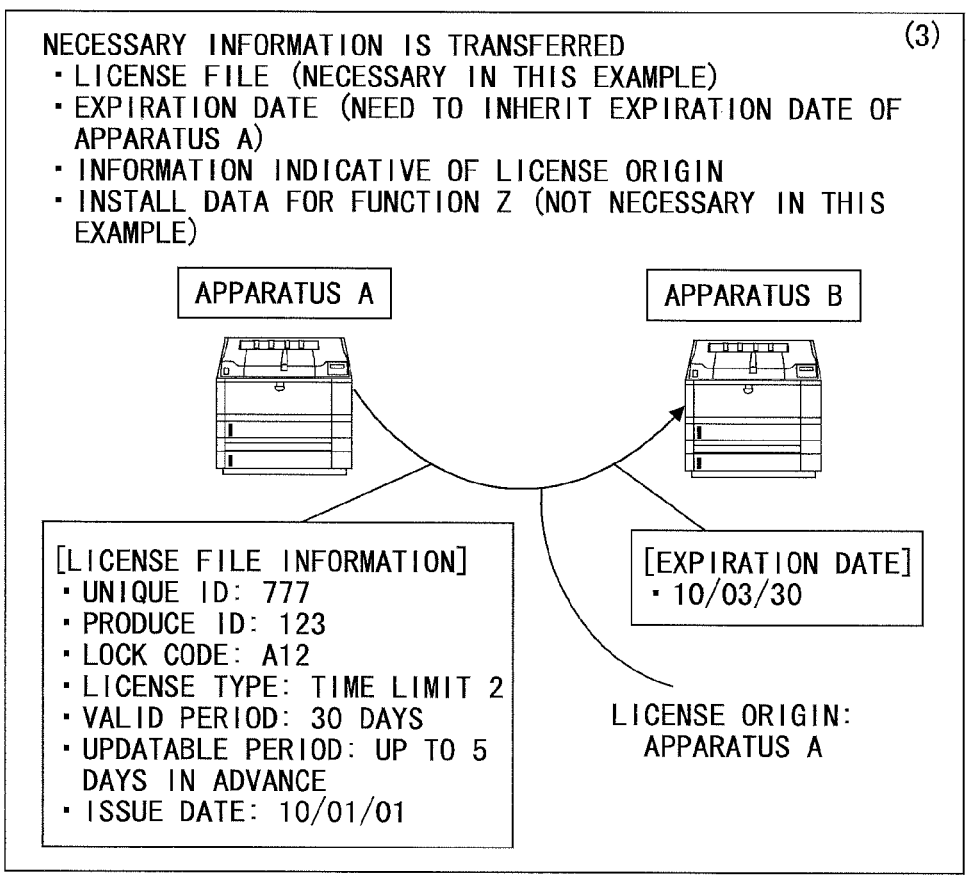
Figure 8D:
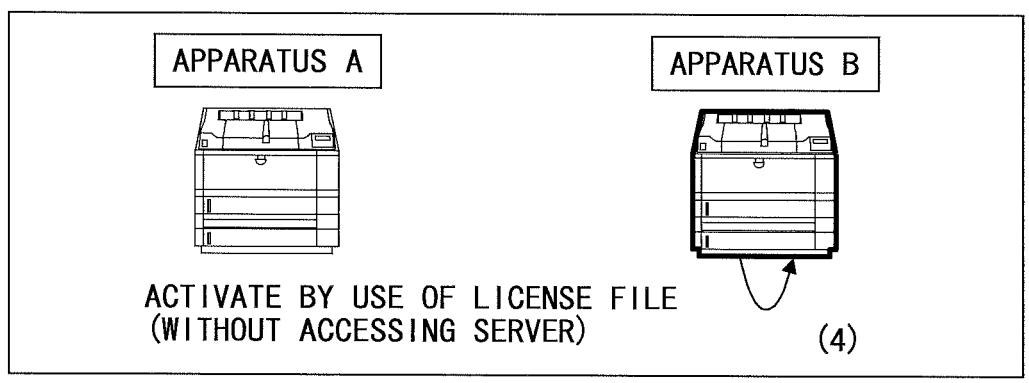
Figure 8E:
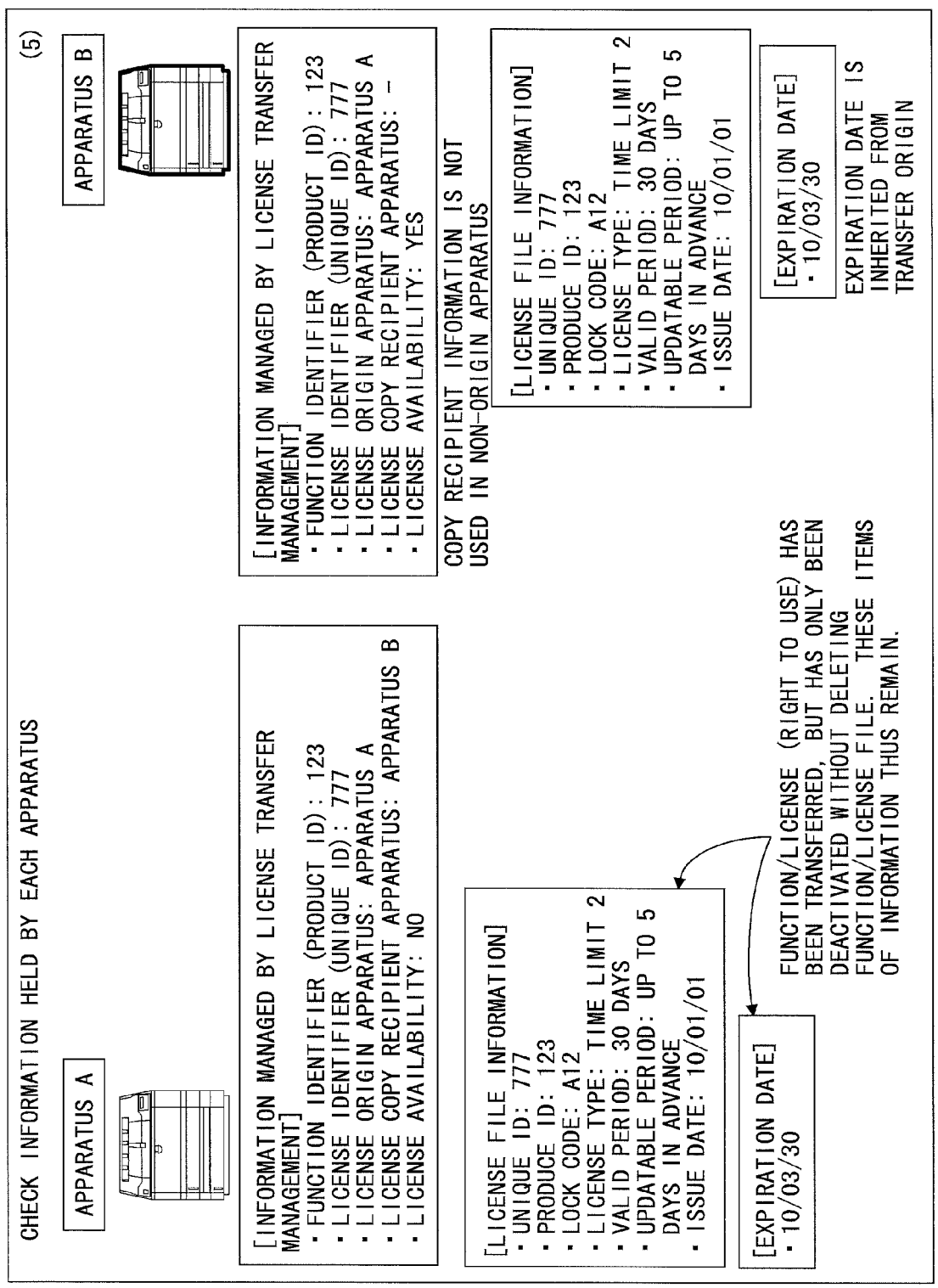
Figure 9A:
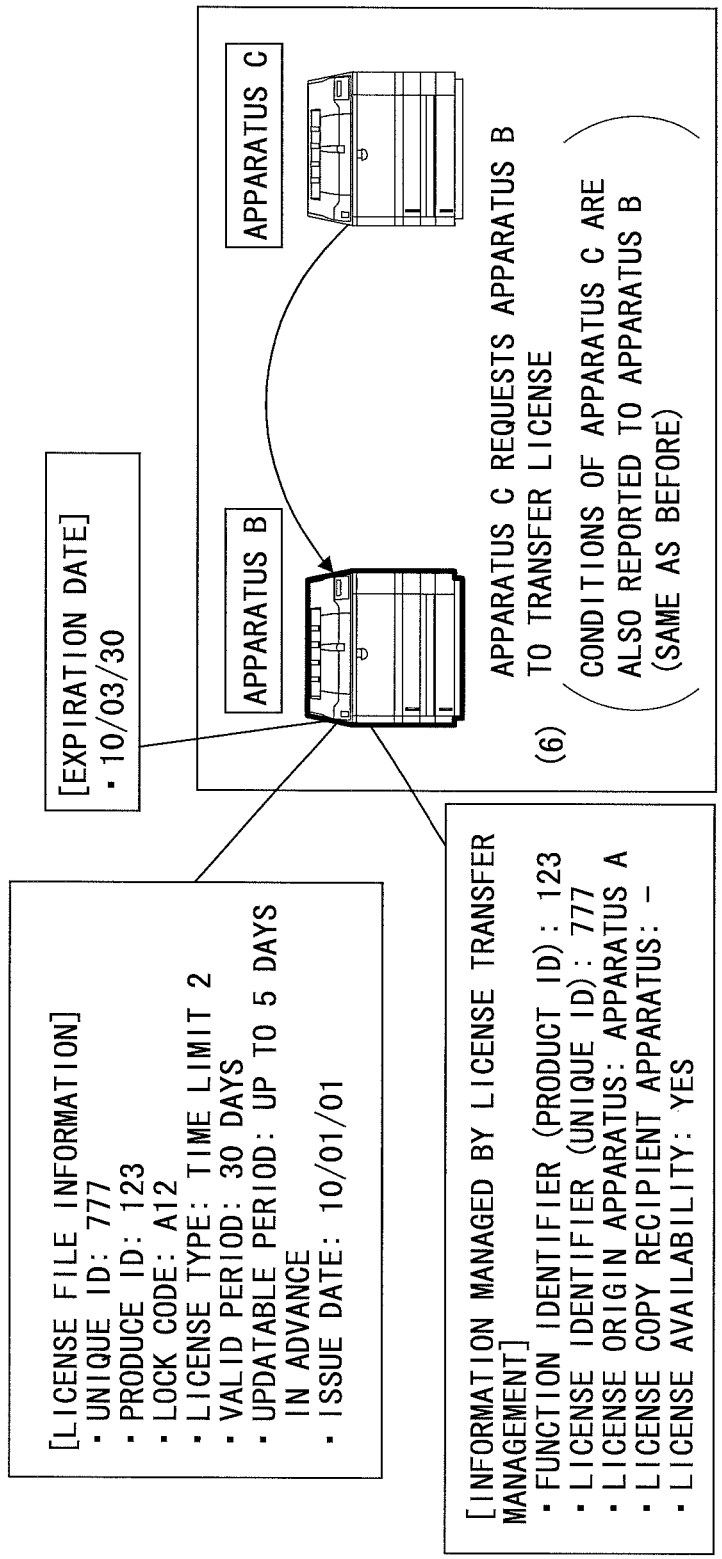
Figure 9B:
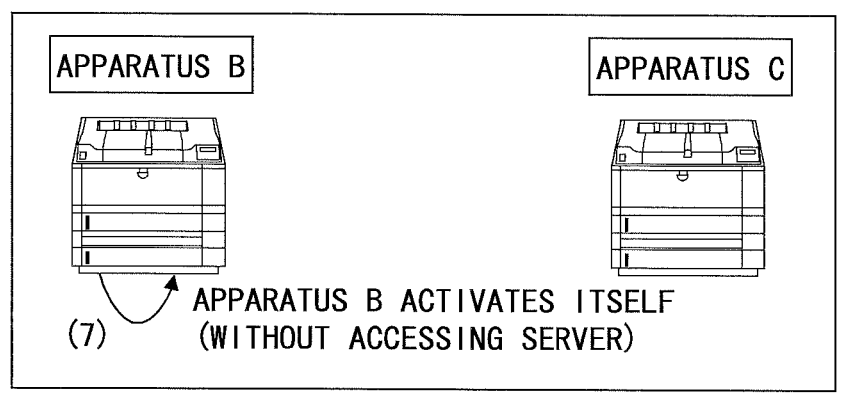
Figure 9C:
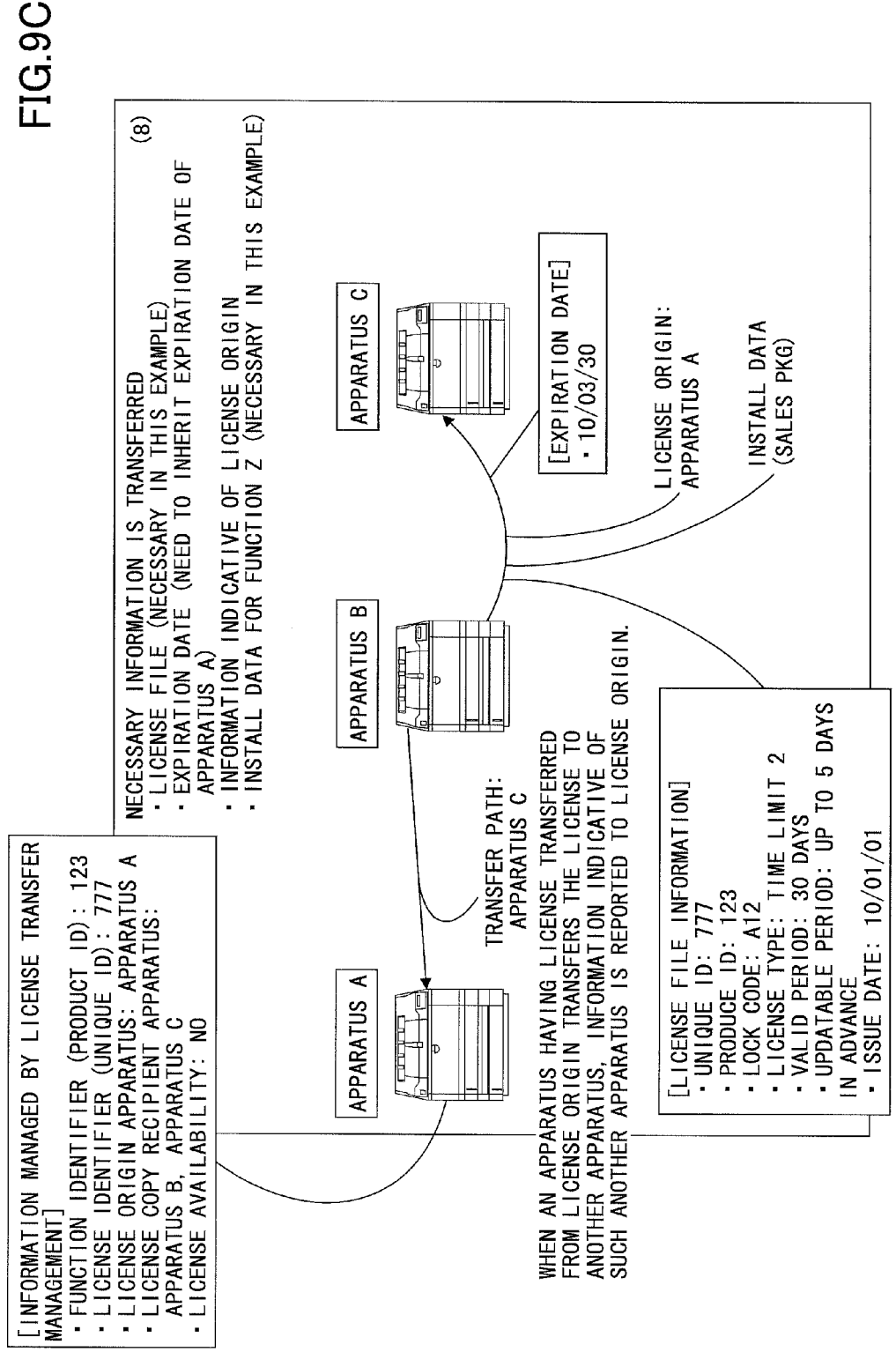
Figure 9D:
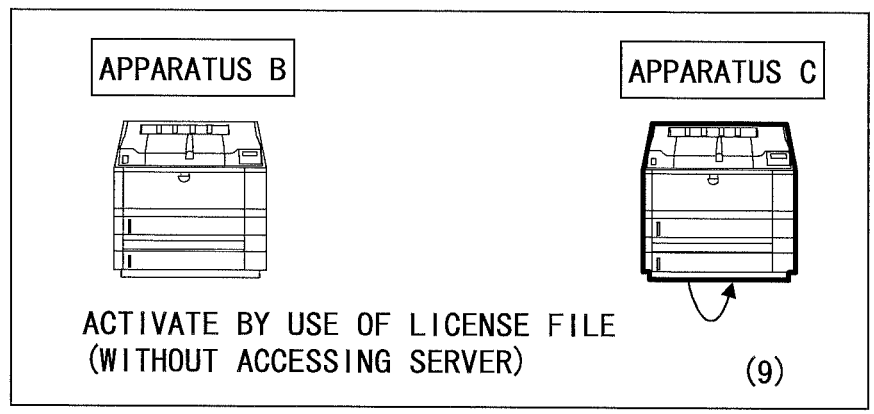

FIG. 7 through FIG. 9 are drawings illustrating a specific example of license transfer, and illustrate changes in the state of license transfer management information observed when a license is transferred between three apparatuses.

FIG. 7 illustrates an initial state. An apparatus A is the origin apparatus that has originally installed a function Z. An apparatus has installed the function Z through a memory device, but has not yet activated the function Z. An apparatus C has no function installed yet. A plug-in with the product ID "123" is referred to as the function Z for the sake of convenience of explanation. The apparatus for which the license is valid has the outline thereof traced with a thick solid line.

FIGS. 8A through 8E illustrate the way the license is transferred from the license origin apparatus A to the apparatus B. FIGS. 9A through 9E illustrate the way the license is transferred from the apparatus B to the apparatus C.

<Operation/Plug-in Operation>

In the following, behaviors at the time of plug-in operation will be described with respect to each state that is observed at each apparatus upon transferring the license. In the descriptions that follow, the term "automatic license update" refers to the technology that performs automatic license update to acquire a new license by communicating with the license management system when the license expiration date (i.e., expiration date of the license origin) approaches, depending on the type of the license. In contrast to the automatic license update, updating the license at any desired timing selected by a user is referred to as "manual license update".

Further, in the following process, a check is first made as to whether the local apparatus is the license origin apparatus.

License Origin Apparatus

[Apparatus Configuration: No License, No Copy (No Activation Yet Performed after Installment)]

Operation: Manual License Update (1) No license is available according to the license availability information. Since there is no copy recipient according to the license copy recipient apparatus information, it is ascertained that the license has not been transferred to another apparatus.

(2) An update license file is obtained by performing a normal license update process via a server.

Operation: Automatic License Update (1) A normal license update process via a server is performed.

(2) No license is available according to the license availability information. However, the license has not been transferred according to the license copy recipient apparatus information. It is thus learned that no update file is necessary. No coordination with another apparatus is needed.

Operation: Deactivate (To Return License)

(1) Since there is no copy recipient according to the license copy recipient apparatus information, it is ascertained that the license has not been transferred to another apparatus. Further, the license is not available according to the license availability information. It is thus learned that no activation has been performed since the installment.

(2) An indication of no need for operation is displayed because no license has yet been obtained.

Operation: Removal (To Remove Function)

(1) Since there is no copy recipient according to the license copy recipient apparatus information, it is ascertained that the license has not been transferred to another apparatus. Further, the license is not available according to the license availability information. It is thus learned that no activation has been performed since the installment.

(2) The relevant function is removed.

(3) The license transfer management information is also removed.

[Apparatus Configuration: No License, Copy Exists (License Transferred After Activation)]

Operation: Manual License Update (1) No license is available according to the license availability information. Since there is a copy recipient according to the license copy recipient apparatus information, it is ascertained that the license has been transferred.

(Pattern A)

(2) A user is prompted to perform the operation after transferring the license to the license origin. The request is denied as being erroneous.

(Pattern B)

(2) A normal license update process via a server is performed despite the absence of the license, thereby updating the license file. Since there is no license, no activation is performed. The updated license file is transferred to each copy recipient apparatus to trigger a license update.

(3) The above-noted process of (2) is performed until all the copy recipients are attended to. This process is retried at intervals upon detecting communication failure or the like.

Operation: Automatic License Update (1) A normal license update process via a server is performed.

(2) License is not available according to the license availability information. According to the license copy recipient apparatus information, further, it is ascertained that the license has been transferred.

(3) The updated license file is copied and transferred to each apparatus to trigger a license update.

(4) The above-noted process of (3) is performed until all the copy recipients are attended to. This process is retried at intervals upon detecting communication failure or the like.

Operation: Deactivate (To Return License)

(1) No license is available according to the license availability information. Since there is a copy recipient according to the license copy recipient apparatus information, it is ascertained that the license has been transferred.

(Pattern A)

(2) Since the license has been transferred from the license origin apparatus to another apparatus, a user is prompted to perform the operation after transferring the license to the license origin apparatus. The request is denied as being erroneous.

(Pattern B)

(2) Respecting the user operation, the apparatus that currently holds the license is identified from the license copy recipient apparatus information (such an apparatus may be directly identifiable, or may be identified by making an inquiry to a copy recipient apparatus about the license availability information), followed by causing the license to be returned to the local apparatus (i.e., taking back the license).

(3) The license is then returned through communication with the server after the license is returned to the local apparatus by the process of (2). An error handling process is performed if the process of (2) cannot take back the license.

Since the license origin has returned the license to the server, no license is available in any apparatus despite the presence of the license file. In this state, the license origin may receive a request to remove the license. In such a case, the license origin having no license can ascertain that the license has been returned to the server since the license origin receives an indication of no license from all the apparatuses upon making an inquiry to these apparatuses about whereabouts of the license.

Operation: Removal (To Remove Function)

(1) No license is available according to the license availability information. Since there is a copy recipient according to the license copy recipient apparatus information, it is ascertained that the license has been transferred.

(Pattern A)

(2) Since the license has been transferred from the license origin apparatus to another apparatus, a user is prompted to remove the function upon performing the process (i.e., deactivate process) to return the license to the server after transferring the license to the license origin apparatus. The request is denied as being erroneous.

(Pattern B)

(2) Respecting the user operation, the apparatus that currently holds the license is identified from the license copy recipient apparatus information (such an apparatus may be directly identifiable, or may be identified by making an inquiry to a copy recipient apparatus about the license availability information), followed by causing the license to be returned to the local apparatus (i.e., taking back the license).

(3) The license is then returned through communication with the server after the license is returned to the local apparatus by the process of (2). An error handling process is performed if the process of (2) cannot take back the license.

(4) The relevant function is removed.

(In Pattern B, Pattern 1 After Removal)

(5) Since the license is not available in the license copy recipients, a user is prompted to remove the function and license file in order to avoid wasteful use of resources allocated to the unavailable function in each apparatus.

(6) The above-noted process of (5) is performed at intervals until all the process is completed.

(7) Upon completion of the process of (6), the license transfer management unit removes the relevant information.

(In Pattern B, Pattern 2 after Removal)

(4) The procedure comes to an end after removing the license transfer management information (i.e., without requesting other apparatuses to attend to removal).

In this case, the license origin is no longer in existence while there are non-origin apparatuses having the license file. An action that requires an origin trigger such as an automatic license update is thus no longer performable. When a non-origin apparatus makes an inquiry, it is ascertained that the function is removed because the license transfer management information is no longer in existence. Information indicative of this fact is sent to the non-origin apparatus as a response to the inquiry, so that the non-origin apparatus can cope with this situation by performing a proper action (e.g., removal of the function) based on its own decision.

[Apparatus Configuration: License Exists, No Copy (Activation Performed After Installment)]

Operation: Manual License Update (1) License is available according to the license availability information. Since there is no copy recipient according to the license copy recipient apparatus information, it is ascertained that the license has not been transferred to another apparatus.

(2) An update license file is obtained by performing a normal license update process via a server.

Operation: Automatic License Update
(1) A normal license update process via a server is performed.
(2) License is available according to the license availability information. Further, the license has not been transferred according to the license copy recipient apparatus information. It is thus learned that no update file is necessary. No coordination with another apparatus is needed.

Operation: Deactivate (To Return License)
(1) Since there is no copy recipient according to the license copy recipient apparatus information, it is ascertained that the license has not been transferred to another apparatus. Further, the license is available according to the license availability information. It is thus learned that a normal deactivate process is proper.
(2) A normal deactivate process is performed to return the license to the server.
After the license origin returns the license to the server in this manner, the license origin may receive a request to remove the license. In such a case, the license origin can ascertain that the license has been returned because the license has not been transferred to another apparatus.

Operation: Removal (To Remove Function)
(1) Since there is no copy recipient according to the license copy recipient apparatus information, it is ascertained that the license has not been transferred to another apparatus. Further, the license is available according to the license availability information. It is thus learned that a normal deactivate process is performable.
(2) A normal deactivate process is performed to return the license to the server first.
(3) The relevant function is then removed.

[Apparatus Configuration: License Exists, Copy Exists (License Transferred After Activation, Followed By Taking Back License)]

Operation: Manual License Update
(1) License is available according to the license availability information. Since there is a copy recipient according to the license copy recipient apparatus information, it is ascertained that a copied license file is present in another apparatus upon transferring the license.
(2) A normal license update process via a server is performed, thereby updating the license file. The updated license file is transferred to each copy recipient apparatus to trigger a license update.
(3) The above-noted process of (2) is performed until all the copy recipients are attended to. This process is retried at intervals upon detecting communication failure or the like.

Operation: Automatic License Update
(1) A normal license update process via a server is performed.
(2) License is available according to the license availability information. Since there is a copy recipient according to the license copy recipient apparatus information, it is ascertained that a copied license file is present in another apparatus upon transferring the license.
(3) The updated license file is copied and transferred to each apparatus to trigger a license update.
(4) The above-noted process of (3) is performed until all the copy recipients are attended to. This process is retried at intervals upon detecting communication failure or the like.

Operation: Deactivate (To Return License)
(1) License is available according to the license availability information. Since there is a copy recipient according to the license copy recipient apparatus information, it is ascertained that a copied license file is present in another apparatus upon transferring the license.
(2) A normal deactivate process is performed to return the license to the server.
Since the license origin has returned the license to the server, no license is available in any apparatus despite the presence of the license file. In this state, the license origin may receive a request to remove the license. In such a case, the license origin having no license can ascertain that the license has been returned to the server since the license origin receives an indication of no license from all the apparatuses upon making an inquiry to these apparatuses about whereabouts of the license.

Operation: Removal (To Remove Function)
(1) License is available according to the license availability information. Since there is a copy recipient according to the license copy recipient apparatus information, it is ascertained that a copied license file is present in another apparatus upon transferring the license.
(2) A normal deactivate process is performed to return the license to the server.
(3) The relevant function is then removed.
(Pattern 1 After Removal)
(4) Since the license is not available in the license copy recipients, a user is prompted to remove the function and license file in order to avoid wasteful use of resources allocated to the unavailable function in each apparatus.
(5) The above-noted process of (4) is performed at intervals until all the process is completed.
(6) Upon completion of the process of (5), the license transfer management unit removes the relevant information.
(Pattern 2 after Removal)
(3) The procedure comes to an end after removing the license transfer management information (i.e., without requesting other apparatuses to attend to removal).

In this case, the license origin is no longer in existence while there are non-origin apparatuses having the license file. An action that requires an origin trigger such as an automatic license update is thus no longer performable. When a non-origin apparatus makes an inquiry, it is ascertained that the function is removed because the license transfer management information is no longer in existence. Information indicative of this fact is sent to the non-origin apparatus as a response to the inquiry, so that the non-origin apparatus can cope with this situation by performing a proper action based on its own decision.

License Non-Origin Apparatus

[Apparatus Configuration: License File Exists, No License (License Acquired, Followed by being Transferred to Another Apparatus)]

Operation: Manual License Update
(1) Based on a license origin check, it is ascertained that the local apparatus is not the license origin.
(Pattern A)
(2) An error is reported because the local apparatus is not the license origin. A user is prompted to perform update at the license origin apparatus.
(Pattern B)
(2) Since a non-origin apparatus cannot access the server, a notice indicative of the receipt of a license update request is sent to the license origin, thereby delegating the license update to the license origin. It may be noted that the manual license update performed at the license origin may propagate to other apparatuses.
(3) An updated license file is transferred from the license origin to indicate an update request, so that an update process (without accessing the server) is performed based on the received license file. A new expiration date is then set. With this, the procedure comes to an end.

If an error occurs in the process of (2) (e.g., the license origin fails to access the server), an error handling process is performed.

Operation: Automatic License Update (1) Based on a license origin check, it is ascertained that the local apparatus is not the license origin.
(2) Automatic license update is not performed (i.e., is skipped). This is because a non-origin apparatus is not allowed to access the server.
(3) Completion of an automatic update process at the license origin is waited for (so that license update is performed in other apparatuses after the automatic license update is performed at the license origin).
(4) An updated license file together with an update request arrives from the license origin, so that an update process (without accessing the server) is performed. A new expiration date is then set. With this, the procedure comes to an end.

When no response arrives from the license origin by the expiration date, an automatic deactivate process could be performed. In this apparatus configuration, however, this automatic deactivate process is skipped since there is no license any longer.

Operation: Deactivate (To Return License)

(1) Based on a license origin check, it is ascertained that the local apparatus is not the license origin.
(2) A check is made as to whether there is a license. Since there is no license, it is ascertained that the license has been transferred to another apparatus.
(3) An indication of no need for operation is displayed because no license has yet been obtained.

Operation: Removal (To Remove Function)

(1) Based on a license origin check, it is ascertained that the local apparatus is not the license origin.
(2) A check is made as to whether there is a license. Since there is no license, it is ascertained that the license has been transferred to another apparatus.
(3) The relevant function is then removed.

Since the function is removed in the local apparatus, a request is sent to the license origin to remove information about the local apparatus from the license copy recipient apparatus information stored in the license origin. This is because there is no need for coordination with the license origin after the removal of the license file.

(Pattern A)
Removal is performed after the copy recipient information in the license origin is successfully modified.

(Pattern B)
Removal is performed first, and, then, a request is sent to the license origin to modify the copy recipient information. In respect of the license transfer management information, the license file and the function are both removed. Because of this, the above-noted request needs to be repeated as a background job until the license origin successfully attends to the request. Namely, the request is sent to the license origin at intervals until the copy recipient information is modified. Before a request to modify the copy recipient information is issued, the license origin may perform license update, and may send the local apparatus a request to update the license. In such a case, a response indicative of no need for update is returned to the license origin because the license transfer management information has already been removed. This response is accompanied with a request to remove the information about the local apparatus from the copy recipient information.

[Apparatus Configuration: License File Exists, License Exists]

Operation: Manual License Update

This manual license update is the same as the manual license update performed in the case of "Apparatus Configuration: License File Exists, No License (License Acquired, Followed By Being Transferred to Another Apparatus)".

Operation: Automatic License Update

This automatic license update is the same as the automatic license update performed in the case of "Apparatus Configuration: License File Exists, No License (License Acquired, Followed By Being Transferred to Another Apparatus)".

Operation: Deactivate (To Return License)

(1) Based on a license origin check, it is ascertained that the local apparatus is not the license origin.
(2) A check is made as to whether there is a license. It is ascertained that there is a license.

(Pattern A)
(3) A message indicating that the apparatus needs to be the license origin in order to return the license through communication with the server (also requesting that the license be returned after transferring the license to the license origin) is displayed. Also, a message indicative of an improper operation is displayed.

(Pattern B)
(3) The local apparatus returns the function. It should be noted, however, that only the license origin can return the license to the server. Accordingly, the local apparatus returns the license to the license origin rather than to the server. That is, the return process for the local apparatus is performed. A message indicating that the license of the local apparatus is returned to the license origin is displayed, together with a message indicating that a deactivate process needs to be performed at the license origin in order to return the license to the server. It should be noted that an operation at the license origin is necessary to return the license to the server.

(Pattern C)
(3) The local apparatus returns the function. It should be noted, however, that only the license origin can return the license to the server. Accordingly, the local apparatus returns the license to the license origin rather than to the server, and also sends the license origin a request to return the license to the server, thereby requesting the license origin to perform a deactivate process after the license is returned to the license origin.

The local apparatus receives a notice of completion of a deactivate process performed at the license origin, followed by presenting a message that the license has been returned to the server. It may be noted that the procedure may come to an end when the deactivate-process request is sent to the license origin. In this case, a message only indicating that a request to return the license to the server is sent to the license origin is displayed. The procedure comes to an end for the local apparatus. Subsequently, a deactivate process is performed at the license origin. A retry procedure is employed at the license origin in order to cope with the situation in which the deactivate process fails due to connection failure or the like.

Operation: Removal (To Remove Function)

(1) Based on a license origin check, it is ascertained that the local apparatus is not the license origin.
(2) A check is made as to whether there is a license. It is ascertained that there is a license.
(3) The license is returned before removal.

(In Case of License Returning Pattern A)
(4) A message is displayed, indicating that the license needs to be returned before removal thereof, and that the license needs to be transferred to the license origin before the license is returned. An error message is also displayed.

(In Case of License Returning Pattern B)

(4) After the license is returned to the license origin, the function is removed. Since the license transfer management information is affected by the removal, a request is sent to the license origin to remove information about the local apparatus from the license copy recipient apparatus information stored in the license origin. With respect to the modification of copy recipient information performed at the license origin at the time of removal, reference may be made to the removal section in "Apparatus Configuration: License File Exists, No License".

(In Case of License Returning Pattern C)

In response to the request to remove the function at the local apparatus, the function is removed after the license is returned to the license origin (i.e., above-noted Pattern B). All that is required is to remove the function at the non-origin local apparatus after the license is transferred to the license origin. It is not required for the license origin to return the license to the server when only the removal of the function is requested.

<Summary>

According to the embodiments described heretofore, information indicative of presence/absence of license is used, as a mechanism to transfer a function/license between apparatuses, independently of presence/absence of a license file supplied from the license management system. The license to use installed software can thus easily be transferred to another apparatus, without requiring a license key and without imposing excessive load on a user. This arrangement can prevent software from being used by a larger number of apparatuses than the number of licenses issued by the license management system, thereby preventing unauthorized use.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese priority application No. 2010-123403 filed on May 28, 2010, with the Japanese Patent Office, the entire contents of which are hereby incorporated by reference.

What is claimed is:

1. An information processing apparatus, comprising:
   an install unit to receive install data for software to install the software for providing a function;
   an acquisition unit to acquire a license file for activating the function;
   a management unit to manage management information, the management information including a license identifier indicative of the license file, origin information indicative of license origin apparatus, recipient information indicative of license copy recipient apparatus, and license information indicative of presence or absence of a license to use the function, independently of presence or absence of the license file;
   a memory device to store programs; and
   a processing device to execute the programs to control the install unit, the acquisition unit, and the management unit,
   wherein the license origin apparatus indicated by the origin information is an apparatus having acquired from an external license management system the license file issued by the external license management system,
   wherein upon the acquisition unit acquiring the license file from another apparatus having the license file, the management unit performs a first updating process in response to detecting that the information processing apparatus having acquired the license file from said another apparatus is the license origin apparatus indicated by the origin information, and performs a second updating process in response to detecting that the information processing apparatus having acquired the license file from said another apparatus is not the license origin apparatus indicated by the origin information, the first updating process setting the license information equal to an indication of presence of the license, the second updating process setting the license information equal to an indication of presence of the license and setting the origin information equal to an indication of the license origin apparatus,
   and wherein upon receiving a license transfer request from a given apparatus, the management unit performs a third updating process in response to detecting that the information processing apparatus having received the license transfer request is the license origin apparatus indicated by the origin information, and performs a fourth updating process in response to detecting that the information processing apparatus having received the license transfer request is not the license origin apparatus indicated by the origin information, the third updating process setting the license information equal to an indication of absence of the license and adding an indication of the given apparatus in the recipient information, the fourth updating process setting the license information equal to an indication of absence of the license and notifying the license origin apparatus of transfer of the license to the given apparatus.

2. The information processing apparatus as claimed in claim 1, further comprising a unit to copy the license file, wherein a copy of the license file is supplied to another apparatus.

3. The information processing apparatus as claimed in claim 2, further comprising a unit to check whether the license file is acquired from a license management system or acquired from another apparatus in conjunction with license transfer.

4. The information processing apparatus as claimed in claim 2, further comprising a unit to identify an apparatus to which the copy of the license file is supplied.

5. The information processing apparatus as claimed in claim 2, further comprising a unit to copy the install data, wherein a copy of the install data is supplied to another apparatus.

6. The information processing apparatus as claimed in claim 5, wherein a given apparatus to which the license is to be transferred already has the license file and the install data, and wherein the license file and the install data are neither copied nor transferred to the given apparatus when transferring the license to the given apparatus.

7. The information processing apparatus as claimed in claim 6, wherein when the license transferred from a transfer-origin apparatus is activated, a valid period effective at the transfer-origin apparatus is applied to the activated function.

8. The information processing apparatus as claimed in claim 1, wherein the license file is acquired not from a license management system but from another apparatus in conjunction with license transfer, and wherein an automatic license file updating process that automatically communicates with the license management system in response to a valid period specified in the license file is not performed even when a time for the automatic license file updating process to be performed has arrived.

9. The information processing apparatus as claimed in claim 1, wherein the license file is acquired from a license management system, and wherein an automatic license file updating process that automatically communicates with the license management system in response to a valid period specified in the license file is performed when a time for the automatic license file updating process to be performed has arrived, and an updated license file is supplied to another apparatus to which a copy of the license file prior to the update has been supplied.

10. The information processing apparatus as claimed in claim 1, wherein the license file is acquired not from a license management system but from another apparatus in conjunction with license transfer, and the license to use the function is present, and wherein a license file returning process that automatically communicates with the license management system in response to a valid period specified in the license file is not performed even when a time for the license file returning process to be performed has arrived, and the license file is returned to the apparatus from which the license file is acquired, rather than being returned to the license management system.

11. The information processing apparatus as claimed in claim 1, wherein the license file is acquired not from a license management system but from another apparatus in conjunction with license transfer, and the license to use the function is present, wherein in order to remove the function, the license file is returned to the apparatus from which the license file is acquired, rather than being returned to the license management system, followed by removing the function.

12. The information processing apparatus as claimed in claim 1, wherein the license file is acquired not from a license management system but from another apparatus in conjunction with license transfer, wherein, when the function is removed, a request to remove information about the information processing apparatus from copy recipient apparatus information is sent to the apparatus from which the license file is acquired.

13. The information processing apparatus as claimed in claim 1, wherein the license file is acquired not from a license management system but from another apparatus in conjunction with license transfer, wherein in order to manually update the license file, a license update request is sent to the apparatus from which the license file is acquired, followed by updating the license file by use of an updated license file supplied in response to the request.

14. The information processing apparatus as claimed in claim 1, wherein the license file is acquired not from a license management system but from another apparatus in conjunction with license transfer, wherein a manual license file updating process is not allowed to be performed.

15. The information processing apparatus as claimed in claim 1, wherein the license file is acquired from a license management system, wherein upon receiving a manual license updating request from a user operating the information processing apparatus, or upon receiving a license updating request from another apparatus to which the license has been transferred, the license is updated by communicating with the license management system, followed by supplying an updated license file to another apparatus to which a copy of the license file prior to the update has been supplied.

16. The information processing apparatus as claimed in claim 1, wherein the license file is acquired not from a license management system but from another apparatus in conjunction with license transfer, and the license to use the function is present, wherein in order to return the license for the function, the license file is returned to the apparatus from which the license file is acquired, rather than being returned to the license management system, followed by performing a deactivate process.

17. The information processing apparatus as claimed in claim 1, wherein the license file is acquired from a license management system, and the license has been transferred to another apparatus, so that there is no license to use the function, wherein the function is not removed even when removal of the function is requested.

18. The information processing apparatus as claimed in claim 1, wherein the license file is acquired from a license management system, and the license has been transferred to another apparatus, so that there is no license to use the function, wherein upon receiving a request to remove the function, the license is retrieved from the apparatus to which the license has been transferred, followed by removing the function.

19. An information processing method, comprising:
an install step of receiving install data for software and installing the software for providing a function;
an acquisition step of acquiring a license file for activating the function;
a management step of managing management information, the management information including a license identifier indicative of the license file, origin information indicative of license origin apparatus, recipient information indicative of license copy recipient apparatus, and license information indicative of presence or absence of a license to use the function, independently of presence or absence of the license file, wherein the license origin apparatus indicated by the origin information is an apparatus having acquired from an external license management system the license file issued by the external license management system;
transferring the license file from a first apparatus having the license file to a second apparatus;
checking whether the second apparatus is the license origin apparatus indicated by the origin information;
performing a first updating process in response to detecting that the second apparatus is the license origin apparatus indicated by the origin information, the first updating process setting the license information equal to an indication of presence of the license;
performing a second updating process in response to detecting that the second apparatus is not the license origin apparatus indicated by the origin information, the second updating process setting the license information equal to an indication of presence of the license and setting the origin information equal to an indication of the license origin apparatus;
checking whether the first apparatus is the license origin apparatus indicated by the origin information;
performing a third updating process in response to detecting that the first apparatus is the license origin apparatus indicated by the origin information, the third updating process setting the license information equal to an indication of absence of the license and adding an indication of the second apparatus in the recipient information; and
performing a fourth updating process in response to detecting that the first apparatus is not the license origin apparatus indicated by the origin information, the fourth updating process setting the license information equal to an indication of absence of the license and notifying the license origin apparatus of transfer of the license to the second apparatus.

20. A non-transitory computer-readable recording medium having a program embodied therein for causing a computer to perform:
- an install step of receiving install data for software and installing the software for providing a function;
- an acquisition step of acquiring a license file for activating the function;
- a management step of managing management information, the management information including a license identifier indicative of the license file, origin information indicative of license origin apparatus, recipient information indicative of license copy recipient apparatus, and license information indicative of presence or absence of a license to use the function, independently of presence or absence of the license file, wherein the license origin apparatus indicated by the origin information is an apparatus having acquired from an external license management system the license file issued by the external license management system;
- transferring the license file from a first apparatus having the license file to a second apparatus;
- checking whether the second apparatus is the license origin apparatus indicated by the origin information;
- performing a first updating process in response to detecting that the second apparatus is the license origin apparatus indicated by the origin information, the first updating process setting the license information equal to an indication of presence of the license;
- performing a second updating process in response to detecting that the second apparatus is not the licensed origin apparatus indicated by the origin information, the second updating process setting the license information equal to an indication of presence of the license and setting the origin information equal to an indication of the license origin apparatus;
- checking whether the first apparatus is the origin apparatus indicated by the origin information;
- performing a third updating process in response to detecting that the first apparatus is the license origin apparatus indicated by the origin information, the third updating process setting the license information equal to an indication of absence of the license and adding an indication of the second apparatus in the recipient information; and
- performing a fourth updating process in response to detecting that the first apparatus is not the license origin apparatus indicated by the origin information, the fourth updating process setting the license information equal to an indication of absence of the license and notifying the license origin apparatus of transfer of the license to the second apparatus.

* * * * *